(12) United States Patent
Kuntz et al.

(10) Patent No.: US 8,571,979 B1
(45) Date of Patent: Oct. 29, 2013

(54) ARRANGEMENTS AND METHODS FOR AUTOMATICALLY DISPERSING AND TRACKING FUNDS

(75) Inventors: Kevin Kuntz, South St. Paul, MN (US); Ron Britz, Andover, MN (US); Jeff Farmer, Brooklyn Park, MN (US); Gene Allen, Vadnais Heights, MN (US)

(73) Assignee: TCF Financial Corporation, Minneapolis, MN (US)

( * ) Notice: Subject to any disclaimer, the term of this patent is extended or adjusted under 35 U.S.C. 154(b) by 1905 days.

(21) Appl. No.: 11/187,611

(22) Filed: Jul. 22, 2005

(51) Int. Cl.
- *G06Q 20/10* (2012.01)
- *G06Q 40/00* (2012.01)
- *G06Q 40/02* (2012.01)
- *G06Q 20/04* (2012.01)

(52) U.S. Cl.
USPC ............... 705/39; 705/35; 705/49; 235/379; 235/380

(58) Field of Classification Search
CPC ....... G06Q 20/10; G06Q 40/00; G06Q 40/02; G06Q 20/102; G06Q 20/04
USPC .......... 235/379, 381, 380; 705/39, 40, 41, 44, 705/35
See application file for complete search history.

(56) References Cited

U.S. PATENT DOCUMENTS

| | | | | |
|---|---|---|---|---|
| 5,748,908 | A * | 5/1998 | Yu | 705/44 |
| 5,890,140 | A * | 3/1999 | Clark et al. | 705/35 |
| RE36,788 | E * | 7/2000 | Mansvelt et al. | 235/379 |
| 6,108,641 | A * | 8/2000 | Kenna et al. | 705/35 |
| 6,422,462 | B1 * | 7/2002 | Cohen | 235/381 |
| 7,072,864 | B2 * | 7/2006 | Brake et al. | 705/41 |
| 7,089,202 | B1 * | 8/2006 | McNamar et al. | 705/35 |
| 7,133,840 | B1 * | 11/2006 | Kenna et al. | 705/35 |
| 7,136,835 | B1 * | 11/2006 | Flitcroft et al. | 705/39 |
| 7,228,292 | B2 * | 6/2007 | Coyle | 705/39 |
| 7,249,073 | B1 * | 7/2007 | Lesk | 705/32 |
| 7,328,190 | B2 * | 2/2008 | Smith et al. | 705/44 |
| 7,720,755 | B1 * | 5/2010 | Coyle | 705/39 |
| 7,752,129 | B2 * | 7/2010 | Bent et al. | 705/40 |
| 2001/0051917 | A1 * | 12/2001 | Bissonette et al. | 705/39 |
| 2002/0007330 | A1 * | 1/2002 | Kumar et al. | 705/36 |
| 2002/0016763 | A1 * | 2/2002 | March | 705/39 |
| 2002/0029190 | A1 * | 3/2002 | Gutierrez-Sheris | 705/39 |

(Continued)

OTHER PUBLICATIONS

Merriam-Webster Online Dictionary, 10th edi., Def. of "associated".*

(Continued)

*Primary Examiner* — Barbara Joan Amelunxen
(74) *Attorney, Agent, or Firm* — Crawford Maunu PLLC

(57) ABSTRACT

In an example application, a banking institution implements a computer-automated arrangement with another corporate entity that is independent of the banking institution. The arrangement permits the other corporate entity to render funds to corporate designees associated with the corporation's bank account via an account-management specification that defines and tracks funds under sub-accounts. The arrangement includes banking-sponsored-corporate-activatable (BSCA) articles; a communication arrangement for communicating an association command from the other corporate entity that associates activated BSCA articles with respective sub-accounts according to the specification, the activated BSCA articles facilitating redemption of pre-paid corporate funds in response to the other corporate entity both issuing the activated BSCA articles to designated card recipients and communicating the association command; and a tracking arrangement for tracking the redemption efforts resulting from uses of the activated BSCA articles by tracking the respective sub-accounts by the banking institution in response to communicating of the association command.

15 Claims, 3 Drawing Sheets

(56) References Cited

U.S. PATENT DOCUMENTS

| | | | |
|---|---|---|---|
| 2002/0138424 A1* | 9/2002 | Coyle | 705/39 |
| 2003/0229596 A1* | 12/2003 | Martinez | 705/64 |
| 2004/0030647 A1* | 2/2004 | Hansen et al. | 705/40 |
| 2004/0133511 A1* | 7/2004 | Smith et al. | 705/39 |
| 2004/0210476 A1* | 10/2004 | Blair et al. | 705/13 |
| 2005/0222944 A1* | 10/2005 | Dodson et al. | 705/39 |
| 2006/0212393 A1* | 9/2006 | Lindsay Brown | 705/40 |
| 2007/0078760 A1* | 4/2007 | Conaty et al. | 705/39 |
| 2007/0124242 A1* | 5/2007 | Reis, Jr. | 705/39 |
| 2007/0130062 A1* | 6/2007 | Huh | 705/39 |
| 2008/0033870 A9* | 2/2008 | Gutierrez-Sheris | 705/39 |

OTHER PUBLICATIONS

Author Unknown, American Express Company. Card News. Special Report; Back to School: Campus cards help boost portfolios. Card News. Potomac: Sep. 30, 1996, pp. 1-3.*

Building the .com enterprise. PC Week. Ziff-Davis, a Softbank company. vol. 16, No. 29, Jul. 19, 1999.*

Hurley et al. An empirical analysis of the security aspects of E-business payment systems. Sout Dakota Business Review, Jun. 2002; 60, 4; ABI/INFORM Global. pp. 1-7.*

Wiehe, S., Establishing an In-House Cash management Bank, Multinational Computer Models, Inc. TMA Journal; May/Jun. 1996; 16, 3; Banking Information Source. pp. 12-16.*

* cited by examiner

ARRANGEMENTS AND METHODS FOR AUTOMATICALLY DISPERSING AND TRACKING FUNDS

FIELD OF THE INVENTION

The present invention relates generally to computer-software implementations for automated tracking of monetary disbursements to individuals.

BACKGROUND

Persons traveling or making temporary changes in habitation often result in situations where existing credit and banking systems are inconvenient and unreliable. These problems may be further complicated when travelers are to receive money from a remotely-located institution.

One method of distributing money to individuals when traveling may involve distributing cash to individuals before the travel commences. However, problems arise regarding the distribution of money via corporate designees, for example, because handling large amounts of cash can result in loss and incorrect distribution. Persons receiving funds are also at risk of loss, and once cash is distributed to a person, the moneys cannot be tracked.

In some money-distribution applications, financial institutions such as banks and credit unions are used as middlemen to transfer money from one location to another and from one individual to another, allowing funds to be transferred to a designee's bank account from another individual or corporation, for example. One problem with funds transfers is that it requires both transferor and transferee to have an established relationship with the financial institution. For an occasional traveler needing to receive money, this may not be practicable.

Bank cards such as debit and credit cards are a common example of how corporate institutions transfer money to a designee. In one example, a corporate institution having a traditional bank account may receive a credit card and issue the credit card to a designee. The designee may then use the card to withdraw money from the corporate institution's bank account. If enabled to access Automatic Teller Machines (ATMs), debit cards shared in this manner could be used to credit money to a transferee located in many places in the world.

There is a need to overcome the limitations and drawbacks of funds distribution and a need to provide more convenient modes of distributing money from corporations to designees such as travelers or temporary residents via financial institutions. Further, there is a need for a system allowing a corporate entity to easily transfer money to a designee via a financial institution without the requirement of establishing individual accounts at branch locations and a need to track and audit purchases by the designee once funds are distributed.

SUMMARY

The present invention is directed to overcoming the above-mentioned challenges concerning money distribution to designees on behalf of corporate representatives and in other embodiments, concerning those involved in auditing and banking tasks in connection therewith. These and other aspects of the present invention are exemplified in a number of illustrated implementations and applications, some of which are shown in the figures and characterized in the claims section that follows.

According to one example embodiment, the present invention is directed to a system that provides cash-redeemable cards associated with a cash-redeeming banking account. The cash-redeemable cards have an identification number and a current dollar value. A banking institution is communicatively coupled through a communications network with a corporate entity that issues the cards for the designated individuals, or designees. Through a communications network, the banking institution and the corporate entity activate the card so that it can be used by the designee. Using the same or another communications network, the designee can attempt to redeem the card at a retail location, such as the banking institution's ATM or a retail store that honors such cards. By way of the card's identification number and current dollar value, the validity of the card and its dollar value can be verified by the banking institution and, if appropriate and as an option, the banking institution can void the card or adjust the dollar value to a lesser amount (e.g., greater than zero).

According to another example, the present invention is directed to an arrangement for rendering funds associated with a master account having a plurality of sub-accounts, and a specification defines account management terms between a banking institution and another corporate entity that is operated independently of the banking institution. The arrangement requires a plurality of banking-sponsored-corporate-activatable (BSCA) cards; a communication arrangement for communicating an association command from the other corporate entity that associates activated ones of the BSCA cards with respective ones of the sub-accounts according to the specification, the activated ones of the BSCA cards becoming useful for redemption of pre-paid corporate funds in response to the other corporate entity both issuing the activated BSCA cards to a designated card recipient for a respective one of the sub-accounts and communicating the association command; and a tracking arrangement for tracking the redemption efforts resulting from uses of the activated BSCA cards by tracking the respective ones of the sub-accounts by the banking institution in response to the communicating the association command.

In yet another example, a method for rendering funds associates a master account and a plurality of sub-accounts and according to a specification defining account management terms between a banking institution and another corporate entity that is operated independently of the banking institution. The method includes generating a plurality of BSCA cards; communicating an association command from the other corporate entity for associating activated ones of the generated BSCA cards with respective ones of the sub-accounts according to the specification, the activated ones of the BSCA cards becoming useful for redemption of pre-paid corporate funds in response to the other corporate entity both issuing the activated BSCA cards to a designated card recipient for a respective one of the sub-accounts and communicating the association command; and tracking the redemption efforts resulting from uses of the activated BSCA cards by tracking the respective ones of the sub-accounts by the banking institution in response to the communicating the association command.

The above summary is not intended to describe each illustrated embodiment or every implementation of the present invention. Other example features and aspects, such as use of data-carrying articles rather than cards, are discussed in connection with the following figures and detailed description that more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
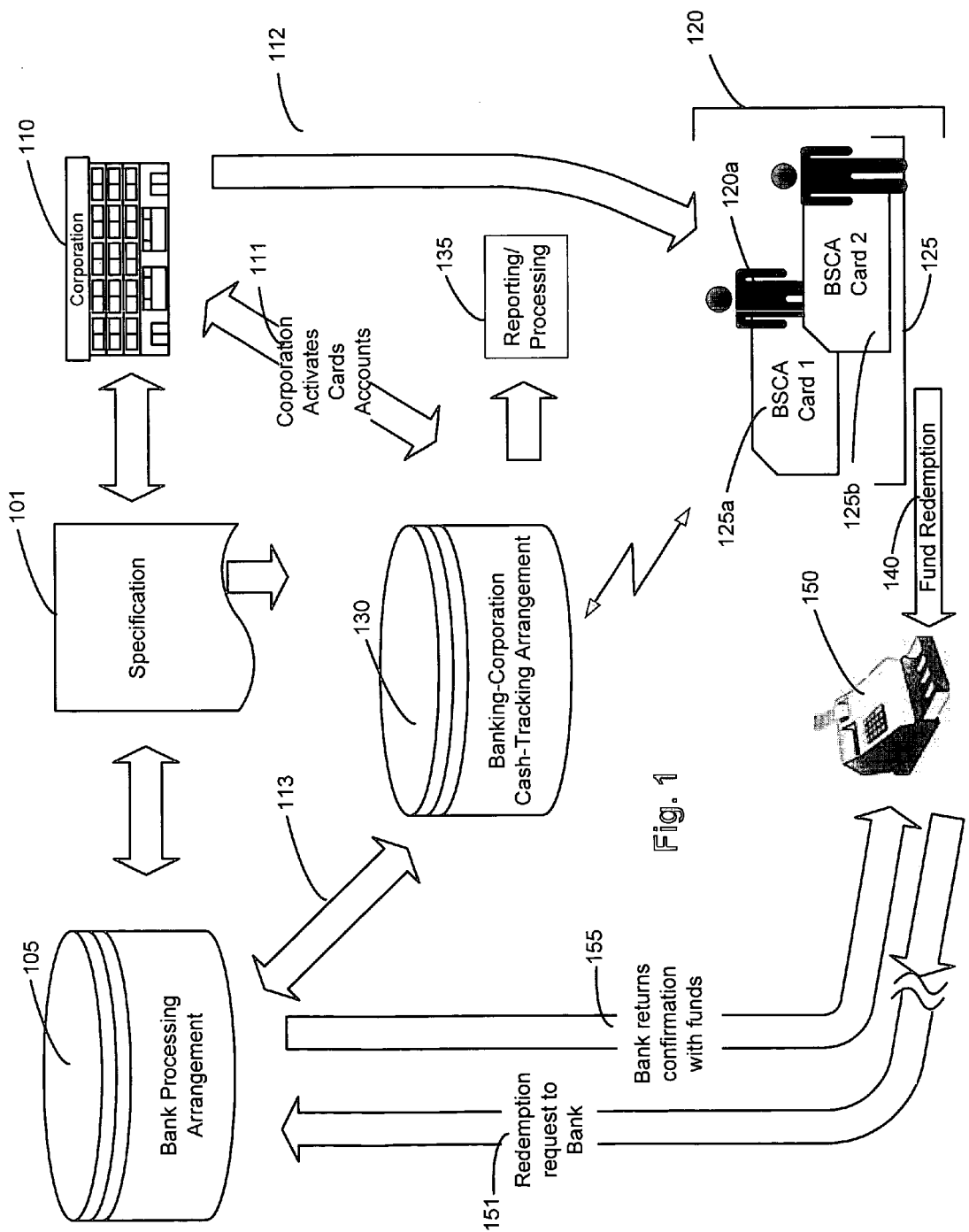
FIG. 1 is a block diagram depicting a method for a corporation to provide banking-sponsored-corporate-activated (BSCA) cards to designated card recipients, in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention has been found to be particularly suited for financial transactions involving a corporate entity needing to distribute and track funds dispersed to individuals. While the present invention is not necessarily limited to such applications, various aspects of the invention may be appreciated through a discussion of examples using this context.

According to one example embodiment of the present invention, a master account and associated sub-accounts are used for distributing and tracking funds using funds-redeemable articles according to a specification as described below. The specification can be used to define account management terms between a banking institution and another corporate entity that is operated independently of the banking institution. The specification can also define the arrangement(s) for communicating (e.g., via the Internet or a CPU) an association command from the other corporate entity that associates, and activates, funds-redeemable articles with respective sub-accounts. The activated funds-redeemable articles may be used for funds redemption by a designated card recipient in response to the specification-based communication arrangement for activating funds-redeemable articles. Once the other corporate entity enables the funds-redeemable articles, the redemption efforts resulting from the use of the activated funds-redeemable articles may be tracked by the banking institution. These actions and operations allow article activities to be tracked and recorded, according to the specification, for each funds-redeemable article and its respective sub-account.

FIG. 1 is a block diagram depicting an arrangement and method that is similar in certain ways to the above-described example embodiment. A specification 101 is used as an operations agreement between a banking institution and an independently-operated corporation 110. The banking institution has pertinent aspects being depicted in the form of bank processing arrangement 105 and cash-tracking data-processing arrangement 130. These arrangements 105 and 130 are configured and operated to use information provided by way of the specification 101 and to communicate with computer/data-processing nodes at the corporation 110 to activate funds-redeemable articles to the corporation-designated individuals 120 (or "corporate designees"). In the example of FIG. 1, these funds-redeemable articles are depicted as 125a and 125b in the form of bank-sponsored corporation-activatable cards ("BSCA cards") to reflect the association of the cards with the sponsoring bank on behalf of the corporation that issues and activates the cards for use by corporate designees.

This arrangement of FIG. 1 is conveniently implemented using a bank account previously established by the corporation 110 at the banking institution, and using associated tracking tools, or sub-accounts, for the corporate designees. In this manner, the corporation 110 renders funds from its corporate bank account to corporate designees 120 on a one-to-one basis, with one distinct sub-account for each corporate designee.

Accordingly, once the sub-accounts are in place, the authorized representative or agent of the corporation 110 activates the BSCA cards and the activated ones of the BSCA cards become useful for redemption of pre-paid corporate funds in response to the other corporate entity issuing the activated BSCA cards to a designated card recipient for a respective one of the sub-accounts and communicating the association command. For example, the cash-tracking data-processing arrangement 130 provides its related CPU and database functions via a communication link to corporation 110 and to banking arrangement 105. With the banking arrangement 105 providing conventional account databases and processing tasks, BSCA-related information is entered or downloaded on the cash-tracking data-processing arrangement 130, the BSCA cards are activated, and the cash-tracking data-processing arrangement 130 can monitor and regulate (validate) use of the cards. The regulation thereby provides reporting and processing tasks to the corporation 110 and, as may be needed, to government and private auditors. Such entered or downloaded information includes information sufficient to identify corporate designees and associated BSCA cards as well as the status (activated or not) of the articles and, in certain embodiments, other information such as validation data and restrictions on use of the BSCA cards as may be provided for in the specification 101.

Using the specification 101 as the operations agreement, an example flow of such tasks is also depicted in FIG. 1. The corporation 110 activates and issues the BSCA cards as shown by flow indicators 111 and 112. The activation of one or more of the cards can occur by a corporate representative (e.g., the representative who would be handing the card to the corporate designee) transmitting an activation signal from a corporate communication node (such as a CPU via the Internet) to a similarly configured bank node within or part of the cash-tracking data-processing arrangement 130. Optionally, the activation procedure and communication protocol can be defined by the specification 101. Such activated BSCA cards 125a-b are thereby associated with a sub-account relative to a previously-established bank account as monitored by the bank processing arrangement 105 per corporate account identification information as defined in the specification.

Using another communication link 113 within the banking institution, the bank processing arrangement 105 and the cash-tracking data-processing arrangement 130 can validate, track and report on subsequent uses of the activated BSCA cards 125a-b as may be set forth in the specification 101. For example, assuming that a corporate designee 120a has been issued a BSCA card 125a that is redeemable for $60, the corporate designee 120a can attempt to redeem the card 125a, via flow indicator 140, at a funds redemption station 150. Using a particularly-defined redemption relationship (such as particularly designated ATMs) set forth in the specification 101 or, alternatively, a conventional validation procedure, the station 150 communicates with the bank processing arrangement 105 (and thereby indirectly with the cash-tracking data-processing arrangement 130) to determine that there are sufficient corporate funds available in the corporate account and that the attempt to redeem the BSCA card 125*a* is proper.

Such merchant redemption and validating funds confirmation communications are depicted at flow indicators 151 and 155. In a more specific example, such funds are redeemed at a merchant station 150 that accepts a BSCA card 125*a* from designated card recipient 120*a*. Card 125*a* is scanned and an electronic request 151 is sent to the banking arrangement 105 for remittance of funds. The electronic request, per flow indicator 151, is processed and the bank transmits funds to the merchant 150, per flow indicator 155, when the request is acceptable and the funds are available.

The banking arrangement 105 and corporation 110 may periodically update tracking arrangement 130 with respect to uses of the cards, card cancellations, losses, etc. This allows tracking arrangement 130 to track the sub-account associated with the BSCA card 125*a* and to follow any parameters set by corporation 110 or banking arrangement 105, according to an embodiment of the present invention. The tracked information related to the BSCA card 125*a* may then be used to generate a report 135, or to update the banking arrangement 105 and corporation 110.

Authenticity and proper use of the funds-redeemable articles are enhanced by using the specification 101 to define a manner of communication between an authorized agent of the corporation and the sub-accounts (e.g., confidential web access instructions with logon, password and account/sub-account identification). In one implementation, the sub-accounts are defined by one corporate representative and another authorized agent of the corporation activates the BSCA cards with respective ones of the sub-accounts accordingly. In another implementation, the sub-accounts are defined by the same authorized representative or agent of the corporation that activates the BSCA cards 125*a-b*. According to the specification 101, the sub-accounts can be defined at approximately the same time as the activation command or these sub-accounts can be defined at different times in order to permit validation by another entity.

The specification 101 of FIG. 1 can be used as an operations agreement between the banking institution and corporation 110, with both entities having access to the specification 101 and, as may be permitted by the specification 101, with both entities having access to the sub-accounts. Information that may be controlled by specification 101 includes master account and sub-account information for corporation 110, and organizational information such as administrative functions and authorizations for both the banking institution and the other corporate entity.

Examples of administrative functions that can be controlled by specification 101 in certain applications include one or more of the following: activation of a sub-account's associated BSCA card; de-activation of a sub-account's associated BSCA card; associating a BSCA card with a particular designated card recipient; allocating and re-allocating funds to BSCA cards; allocating funds to certain categories designated on the BSCA cards; periodically updating features on the card; setting personal identification number (PIN) options; and assigning an expiration date to the card.

Other embodiments contemplated by the present invention include implementation of the funds-redeemable article as a type of physical article other than BSCA card 125. Such other article types include, for example, items including specific and recognizable data for redemption of monetary funds. In various embodiments, card-like articles are implemented as information-carrying items (sometimes electronically encoded) such as Smart Cards, smart pens, and key chains having computer readable data storage. Additionally, the article may have features that can be manipulated such as by the designee or merchant to indicate and change a status of the article; examples include rendering an article as inactive, partially redeemable or fully redeemable. In certain more specific embodiments, these features are implemented as scratch-off portions, tear-off sections, punch areas, or magnetic deactivation portions.

Figure 2:
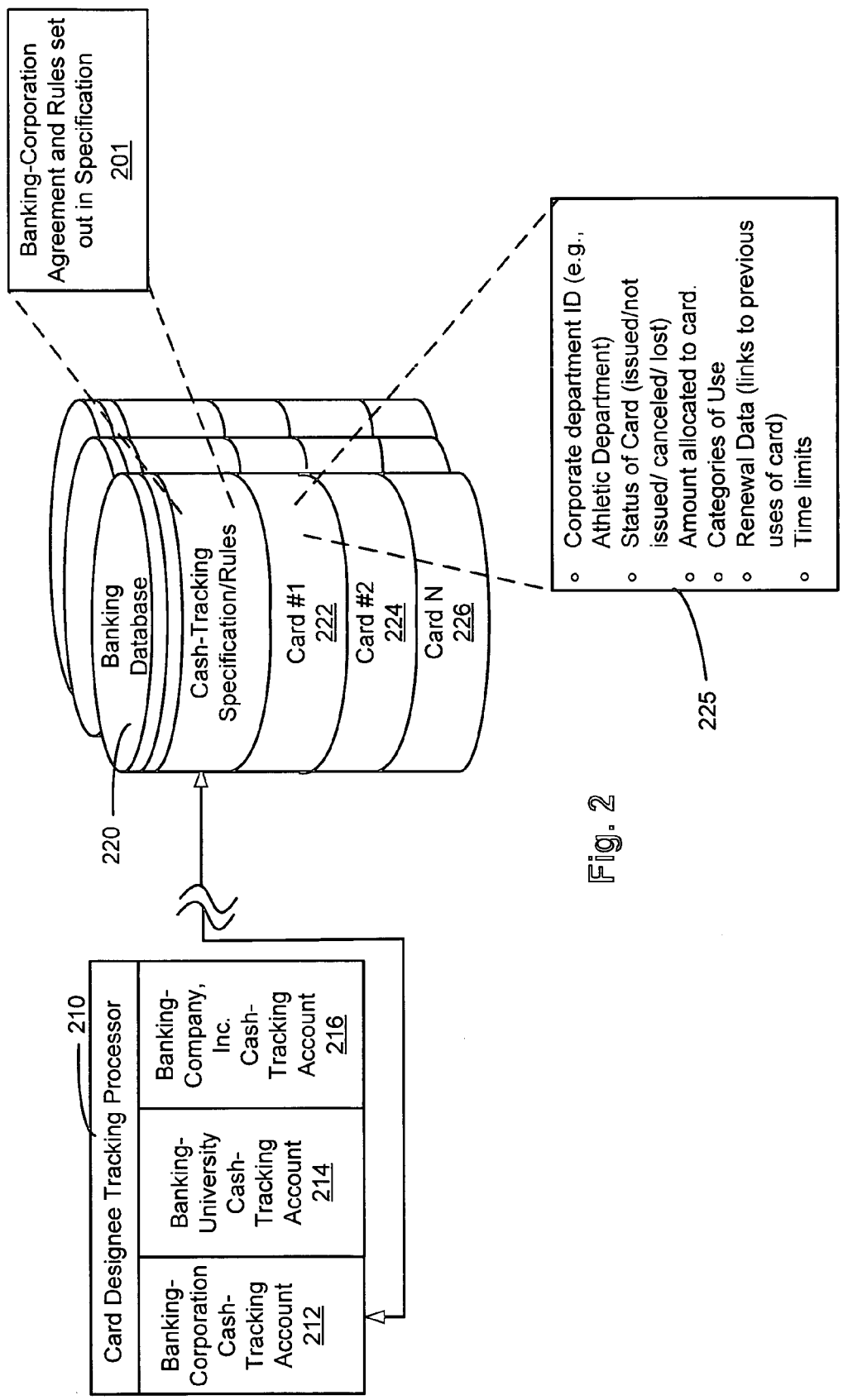
FIG. 2 illustrates two levels of a banking arrangement organized according to an embodiment of the invention.

FIG. 2 illustrates a card designee tracking processor 210 and a banking database 220 which may be co-located with (or remotely situated from) bank processing arrangement 105. The banking database 220 is organized and used for storing, updating and generally tracking account and BSCA card data. Card designee tracking processor 210 receives and processes data associated with a variety of cash-tracking accounts. For example, banking-corporation cash-tracking account 212, banking-university cash-tracking account 214, and banking-company cash-tracking account 216 may be associated with card designee tracking processor 210.

Each cash-tracking account may be associated with another level of a banking arrangement, banking database 220, which stores specification data, processed account data, and BSCA card data, for example. In FIG. 2, banking-corporation cash-tracking account 212 is associated with banking database 220. Data stored on banking database 220 includes data specific to the banking-corporation cash-tracking account 212. For example, the specification agreement between the banking entity and the corporation 201 may be stored on banking database 220. Banking database 220 may further include data for facilitating the management and tracking of the sub-accounts as set forth in agreement 201.

Banking database 220 further includes the specification-controlled corporate banking account data and its associated sub-account/card data. For example, each card distributed by the corporation has an associated sub-account, and the sub-account and card information may be stored on banking database 220. According to FIG. 2, information related to card #1 (depicted via figure numeral 222), card #2 (depicted via figure numeral 224), and card N (depicted via figure numeral 226), may be stored on banking database 220. Card #1 is associated with information 225 that includes, but is not limited to, the sub-account's corporate department ID, e.g., athletic department; the status of the card, such as issued, not issued, canceled, or lost; the funds allocated to the card; the categories of use assigned to the funds; renewal data for modifying funds on the card; and expiration data. Card #2 and card N may have the same type of information associated as card #1, or may include different information.

Figure 3:
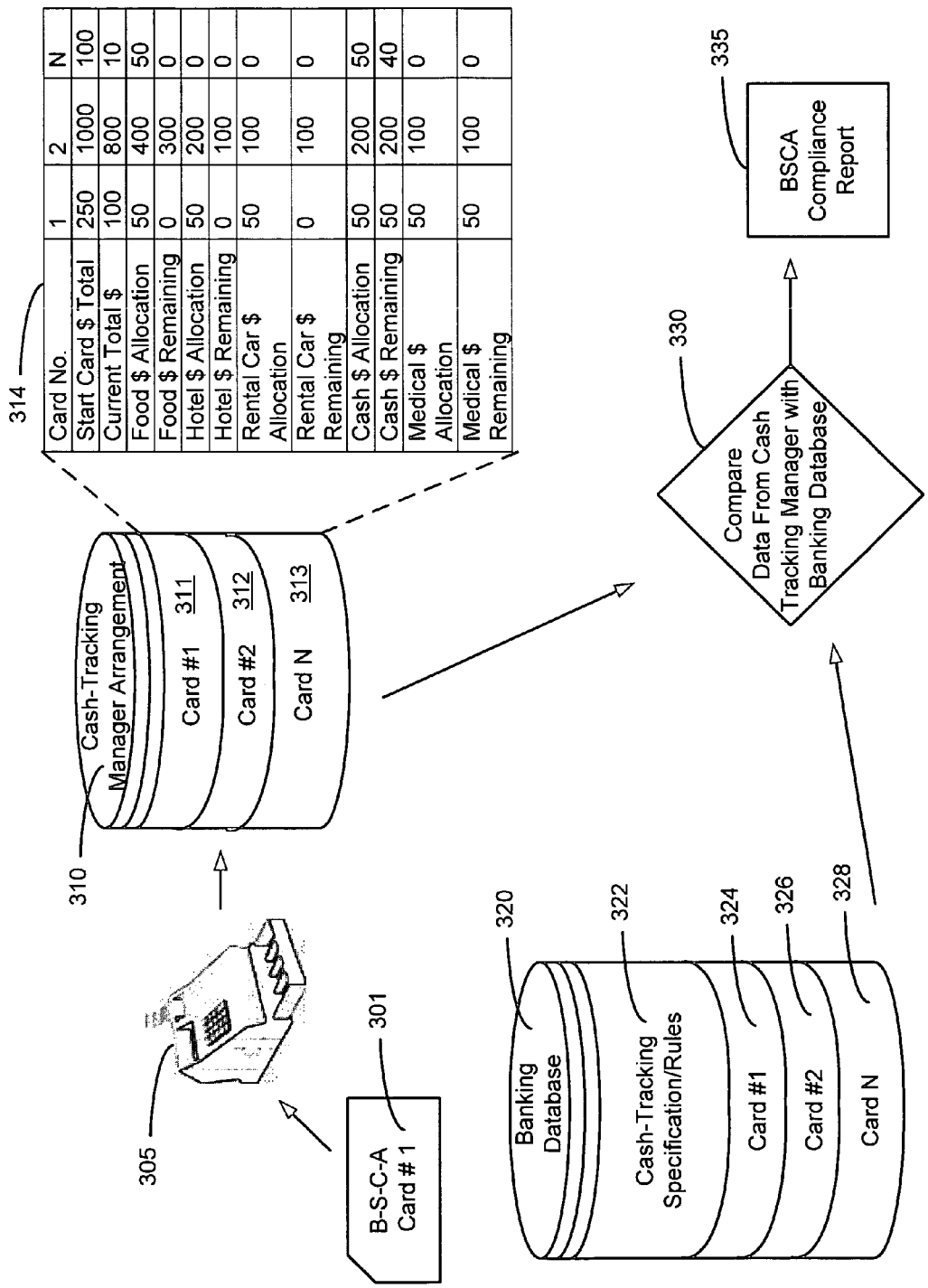
FIG. 3 illustrates a block diagram depicting a comparison of the cash tracking manager arrangement information with banking arrangement information in order to generate a banking-corporation cash-tracking compliance report, in accordance with an embodiment of the invention.

FIG. 3 illustrates a block diagram depicting a comparison 330 of the cash-tracking manager arrangement 310 information with the banking database 320 information in order to generate a banking-corporation cash-tracking compliance report 335, in accordance with an embodiment of the invention. BSCA card 301 is used at redemption centers 305 such as hotels, restaurants, hospitals, rental car agencies, or cash machines. The redemption centers 305 transmit redemption information which ultimately reaches the cash-tracking manager arrangement 310. For example, the redemption information may reach the cash-tracking manager arrangement 310 via the banking institution's bank processing and accounts database (not shown).

Data at the cash-tracking manager arrangement 310 is organized and sorted based on funds allocated to the card, and on whether funds allocated are designated for a specific purpose. In FIG. 3, record 314 keeps track of the status of cards #1 311, #2 312, and N 313. In record 314, each card is assigned a total card value and an original allocation amount for food, lodging, transportation, cash, and medical expense funds. For example, for card #1 311, the food allocation is $50. The current or remainder of total funds available on each card is also listed, as well as the remaining funds amount for each funds category in record 314. For example, for card #1 311, the food funds remaining is $0. Data stored on cash-tracking manager arrangement 310 is not limited to the data types depicted in record 314. The record 314 is merely a depiction of possible records for storage. Other records or data that may be stored in record 314 includes redemption rejection data, date, time, and location of transaction, expiration data, and renewal data.

Data stored at cash-tracking manager arrangement 310 and at banking database 320 are sent to a comparator 330 which may be housed in the banking-corporation cash-tracking arrangement (not shown) or may be housed separately. Using the information from cash-tracking manager arrangement 310 and banking database 320, the comparator 330 generates a banking-corporation cash-tracking compliance report 335.

In another example embodiment, cash-tracking manager arrangement 310 is arranged according to options selected by the corporation, and reflected in the banking-corporation specification. Cash-tracking manager arrangement 310 can be set up in a robust manner, as reflected by the specification, where a large number of features are enabled on the cash-tracking manager arrangement 310 for the corporation's master account and associated sub-accounts. The BSCA cards having their related sub-accounts also have a large number of features available. For example, the BSCA card may be used for several types of redemption categories that include food, lodging, car rental, cash, and medical. The categories may be further classified so that certain categories on the BSCA card may only be redeemed within a certain geographic area, e.g. the destination city where a basketball team travels. Furthermore, each transaction may be tracked as to date, time, location, and sub-categories of goods or services listed within the BSCA card categories.

The cash-tracking manager arrangement 310 may alternatively be set up with operating parameters having less robust features as compared to the example embodiment above. The master account and sub-accounts with their respective BSCA cards have features assigned to it based on the capabilities of the cash-tracking manager arrangement 310 which may be a simple or complex arrangement. In another example embodiment the cash-tracking manager arrangement 310 may be complex, but may have features disabled. In both a simple and a feature disabled cash-tracking manager arrangement 310, the BSCA cards would have a limited number of features available for the designated card recipient. In these cases, the BSCA cards and associated sub-account may have money allocated to it for food and lodging use only. Additionally, the transactions may be recorded using only information related to the amount and location of the transaction or to the amount and date of the transaction, for example.

In a general implementation of the present invention, the cash-tracking manager arrangement 310 is set up to track funds redemption without categorizing the use of funds. The designated card user would receive an activated card that would be useful anywhere credit cards are accepted or at ATMs worldwide, for example.

As described above, the specification indicates how the cash-tracking manager arrangement 310 is organized. Additionally, the specification indicates the amount of detail in which cash-tracking manager arrangement 310 reports information. An arrangement having every feature available and enabled for the master and sub-accounts may not necessarily report all of the activity recorded. When a BSCA card is used, cash-tracking manager arrangement 310 records information related to the redemption transaction such as category of transaction, date, location, and time of the redemption attempt, the sub-category of the transaction, and whether the transaction was accepted or rejected, for example. The information may be recorded for each category of funds redemption available, e.g. food, lodging, and cash. However, reporting may include only some of the available redemption categories, e.g. food and lodging. Reporting BSCA funds redemption activity may be as detailed as the data recorded on cash-tracking manager arrangement 310, or may be as general as to report that the card was activated and allocated to a designated card recipient.

The specific or general nature of reporting BSCA card activities is based upon the corporation's needs as reflected on the specification and upon database and processing capabilities. For example, if reporting food and lodging expenses is required for auditing purposes, the reports generated for the customer may include figures for only the food and lodging categories, even if detailed information related to additional BSCA categories is stored.

Embodiments of the present invention allow the designated card recipient to benefit from using the BSCA card by reducing the need to carry cash, by providing convenient access to ATMs, and by allowing the card to be used at merchants that accept credit cards. Other corporate entities benefit from embodiments of the present invention because the need for administrators or staff to handle cash is reduced, depletion of funds may be more easily tracked, and audit controls may be improved.

While the present invention has been described with reference to several particular example embodiments, those skilled in the art will recognize that many changes may be made thereto without departing from the spirit and scope of the present invention. For example, many of the various examples and approaches above involve transactions between a single banking institution and another corporate entity. However, these approaches may be implemented with a multitude of other corporate entities. While not limiting, examples of applicable banking institutions are interstate and intrastate-type national banks. Similarly not limiting, examples of other corporate entities institutions include companies, universities, non-profit organizations, individual employers, and sports teams.

What is claimed is:

1. For use with a banking institution and another corporate entity that is operated independently of the banking institution, a computer-facilitated method for rendering funds associated with a master account holding funds of the other corporate entity and having a plurality of sub-accounts and according to account management terms between the banking institution and the other corporate entity, the computer-facilitated method comprising:

providing a plurality of banking-sponsored-corporate-activatable articles including physical cards;

communicating, via a computer, an association command from the other corporate entity, the association command associating activated ones of the articles with respective ones of the sub-accounts according to the validation procedure that defines account management terms between the banking institution and the other corporate entity, enabling, via a computer, redemption of pre-paid corporate funds from respective sub-accounts that are associated with the activated articles, designating, via a computer, articles recipients and issuing the activated ones of the articles to the designated articles recipients for respective ones of the sub-accounts and in response to the communicating of the association command; and tracking, via a computer, redemption of pre-paid corporate funds from the sub-accounts resulting from uses of the activated ones of the articles by tracking the respective ones of the sub-accounts by the banking institution in response to the communicating of the association command.

2. The method of claim 1, wherein communicating the association command from the other corporate entity is for providing association data for the designated article recipient with said article in order to associate the sub-accounts with the designated article recipients and to track the designated article recipient's redemption of pre-paid corporate funds.

3. The method of claim 1, wherein communicating the association command comprises sending the association command from the other corporate entity in response to issuance of the activated ones of the articles to the designated article recipients.

4. The method of claim 1, wherein providing the plurality of articles further comprises generating a plurality of articles having P-I-N features for enabling secure redemption of pre-paid corporate funds by the designated article recipients and setting the personal identification numbers of the activated ones of the articles.

5. The method of claim 1, further comprising reporting information regarding the tracked redemption of pre-paid corporate funds resulting from uses of the activated ones of the articles.

6. The method of claim 1, wherein tracking the redemption of pre-paid corporate funds comprises tracking redemption of pre-paid corporate funds resulting from the activated ones of the articles according to a plurality of transaction characteristics.

7. The method of claim 6, further comprising reporting the redemption of pre-paid corporate funds resulting from activated ones of the articles to the other corporate entity according to one or more of the plurality of transaction characteristics.

8. The method of claim 6, wherein one of the plurality of transaction characteristics is a transaction-refusal characteristic corresponding to a refused redemption of pre-paid corporate funds.

9. The method of claim 1, wherein tracking the redemption of pre-paid corporate funds comprises tracking the redemption of pre-paid corporate funds relative to a set of expendable funds limits.

10. The method of claim 9, wherein each of the expendable funds limits in the set of expendable funds limits is associated with a funds allocation category.

11. The method of claim 9, wherein the set of expendable funds limits are periodically updated, allowing modification of the one or more of the expendable funds limits.

12. The method of claim 1, wherein tracking the redemption of pre-paid corporate funds further comprises associating an expiration date for each of the activated ones of the articles and its corresponding sub-account and tracking the status of said articles.

13. The method of claim 1, wherein generating the plurality of articles comprises generating a plurality of articles having a set of manipulable portions indicative of at least one redemption status.

14. The method of claim 1, wherein the set of manipulable portions indicative of at least one redemption status further includes a set of funds allocation portions indicative of a set of funds allocation categories.

15. The method of claim 1, wherein providing the plurality of articles comprises generating a plurality of articles having one or more disposable portions.

\* \* \* \* \*